United States Patent [19]

Higgins et al.

[11] Patent Number: 4,918,291
[45] Date of Patent: Apr. 17, 1990

[54] ELECTRIC HEATER ASSEMBLIES

[75] Inventors: George A. Higgins, Hagley; Richard C. Scott, Stourport on Severn, both of United Kingdom

[73] Assignee: Micropore International Limited, Worcestershire, United Kingdom

[21] Appl. No.: 232,786

[22] Filed: Aug. 16, 1988

[30] Foreign Application Priority Data

Aug. 25, 1987 [GB] United Kingdom ................ 8720056

[51] Int. Cl.⁴ .............................................. H05B 1/02
[52] U.S. Cl. .................................... 219/464; 219/449; 219/452; 219/446
[58] Field of Search ............... 219/464, 448, 449, 452, 219/458, 459, 461, 501, 446

[56] References Cited

U.S. PATENT DOCUMENTS

| | | | |
|---|---|---|---|
| 3,355,574 | 11/1967 | Bassett | 219/464 |
| 4,430,554 | 2/1984 | Fleischmann | 219/501 |
| 4,493,979 | 1/1985 | Bredel | 219/449 |
| 4,502,461 | 3/1985 | Keating | 219/450 |
| 4,634,842 | 1/1987 | Payne | 219/501 |
| 4,772,779 | 9/1988 | Scheidler | 219/449 |

Primary Examiner—Teresa J. Walberg
Attorney, Agent, or Firm—Browdy and Neimark

[57] ABSTRACT

An electric heater assembly for a glass ceramic top cooker includes a plurality of electric heating elements, a thermal cut-out device incorporating a first set of contacts for controlling the supply of electric current to at least one of the heating elements, and a relay associated with the thermal cut-out device and incorporating a second set of contacts for controlling the supply of electric current to at least another of the heating elements. In the event of the thermal cut-out device detecting a first predetermined temperature the first set of contacts moves from a first position to a second position causing the second set of contacts to move from a first position to a second position and in co-operation with the second set of contacts connects the heating elements in a lower power configuration or cuts off the supply of electric power to the heating elements. When the thermal cut-out device subsequently detects a second predetermined temperature lower than the first predetermined temperature the first set of contacts moves from its second position to its first position causing the second set of contacts to move from its second position to its first position thus connecting the heating elements in their original configuration.

9 Claims, 2 Drawing Sheets

ELECTRIC HEATER ASSEMBLIES

FIELD OF THE INVENTION

The present invention relates to electric heater assemblies such as may be used in electric cookers having a glass ceramic cooking surface.

DESCRIPTION OF PRIOR ART

Electric heater assemblies are known which comprise a metal dish containing a base layer of thermal and electrical insulating material, a peripheral wall of insulating material and a plurality of heating elements. The heating elements may be of bare resistance wire or may be in the form of infra-red lamps. A thermal cut-out device is provided to disconnect all power to the heating elements in the event of overheating so as to protect the glass ceramic surface from discoloration or even breakage. Where, as hitherto has been the case, the rating of the heating elements does not exceed about 2500 watts a thermal cut-out device having a standard current rating of ten amps is employed. However, where the current exceeds ten amps it is necessary to provide some means for accommodating the higher current in order to avoid premature failure of the thermal cut-out device. One way in which the problem could be overcome would be to use an alternative thermal cut-out device having a higher rating or additional contacts of the same rating. However, the expense involved in developing and life testing such a device is unlikely to be commercially economic.

OBJECT OF THE INVENTION

It is an object of the present invention to provide an electric heater assembly which is capable of accommodating relatively high current.

SUMMARY OF THE INVENTION

According to the present invention there is provided an electric heater assembly for a glass ceramic top cooker comprising:
a plurality of electric heating elements;
a thermal cut-out device incorporating a first set of contacts for controlling the supply of electric current to at least one of the heating elements; and
means associated with the thermal cut-out device and incorporating a second set of contacts for controlling the supply of electric current to at least another of the heating elements,
wherein in the event of the thermal cut-out device detecting a first predetermined temperature the first set of contacts moves from a first position to a second position thereby causing the second set of contacts to move from a first position to a second position and in co-operation with the second set of contacts connects the heating elements in a lower power configuration or cuts off the supply of electric power to the heating elements and wherein when the thermal cut-out device subsequently detects a second predetermined temperature lower than the first predetermined temperature the first set of contacts moves from its second position to its first position thereby causing the second set of contacts to move from its second position to its first position and connecting the heating elements in their original configuration.

The heating elements may be in the form of infra-red lamps. Four electric heating elements may be provided.

The means associated with the thermal cut-out device may comprise a relay. The relay may incorporate a coil which is connected in parallel with the first set of contacts. Alternatively, the relay may incorporate a coil which is connected in parallel with one of the heating elements. In this case, a voltage dependent resistor may be connected in series with the relay coil.

For a better understanding of the present invention and to show more clearly how it may be carried into effect reference will now be made, by way of example, to the accompanying drawings in which:

DESCRIPTION OF PREFERRED EMBODIMENTS

Figure 1:
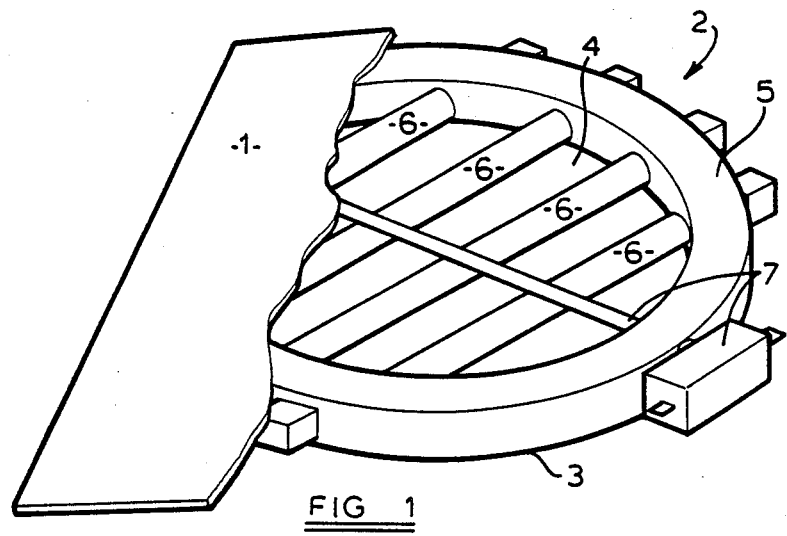
FIG. 1 is a perspective schematic view, partly cut away, of an electric heater assembly arranged beneath a glass ceramic cooking surface.

FIG. 1 shows a known radiant electric heater 2 arranged beneath a glass ceramic cooking surface 1. The heater comprises a dish 3, for example made of metal, the dish containing a base layer 4 of thermal and electrical insulation material such as a microporous material sold under the Registered Trade Mark MICROTHERM. A peripheral wall 5, for example of ceramic fibre material, extends around the internal periphery of the dish 3. Four heating elements 6 in the form of infra-red lamps extend above the base layer 4 and a thermal cut-out device 7 in the form of a probe-type differential expansion switch extends between the heating elements 6 and operates to disconnect the heating elements from a source of electrical energy (not shown) should the probe of the thermal cut-out device exceed a first predetermined temperature so as to protect the glass ceramic cooking surface from excessive temperatures. After the thermal cut-out device has operated to disconnect the source of electrical energy the temperature will decrease and at a second predetermined temperature, lower than the first predetermined temperature, the thermal cut-out device will operate to connect the source of electrical energy once again.

Although the arrangement described with respect to FIG. 1 has been found satisfactory for lower power heaters, it is not suitable for heaters operating at higher power ratings, for example of the order of 4 kW. The total current drawn at these higher powers exceeds the 10 ampere rating of normal commercially available limiters. It would be possible, as noted earlier, to provide the limiter with higher-rating or additional contacts. However, the development and life-testing of such a device would be very costly and time consuming. Another solution would be to use the limiter to operate a relay which in turn controls the heater. However, to interrupt the heater current such a relay would itself need either high current rating contacts or at least two sets of lower rating contacts. In either case the relay would be relatively expensive. More complex control of the energisation of the heater lamps would require additional relay contacts for individual switching of different parts of the heater circuit, also increasing the relay cost. These problems are avoided or at least alleviated with the present invention.

Figure 2:
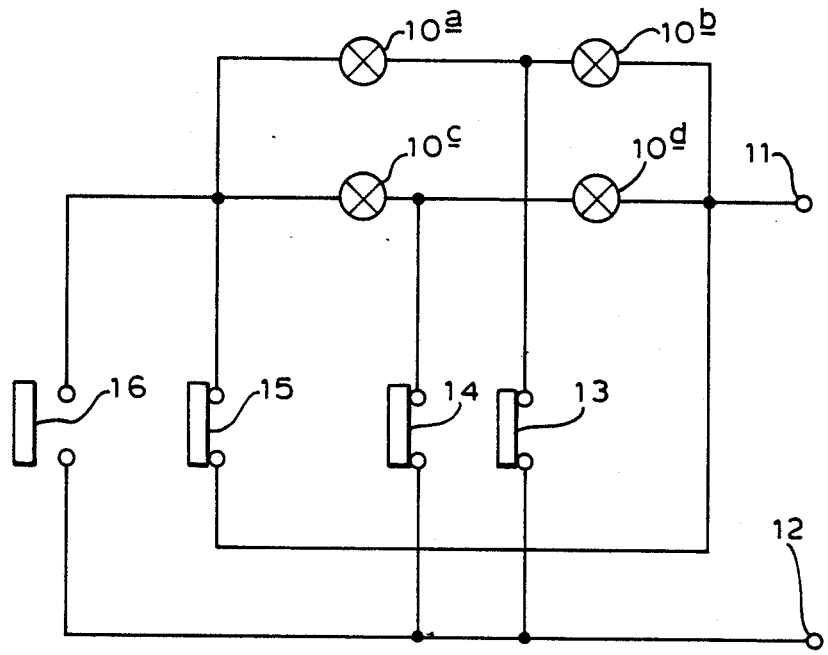
FIG. 2 is a circuit diagram illustrating one embodiment of an electric heater assembly according to the present invention.

In the embodiment of the electric heater assembly according to the present invention illustrated by the circuit diagram of FIG. 2 are four heating elements 10a, 10b, 10c and 10d in the form of infra-red lamps which may be rated at, for example, 1000 watts each and which are arranged in a heater having a diameter of for example 300 mm. Different power levels for the heater can be obtained in a number of ways. For example in one embodiment the different power levels can be obtained by a switch which connects the lamps in various parallel and series configurations, the configuration shown in FIG. 2 corresponding to full power. Alternatively, the different power levels of the heater can be obtained by connecting connections 11 and 12 of the heater shown in FIG. 2 to a suitable control device such as a known energy regulator or an electronic phase control or mark-to-space ratio regulator.

The contacts of the thermal cut-out device are incorporated into the electrical circuit in such a way that only part of the electric current passing through the heater actually passes through the contacts of the thermal cut-out device. In the circuit diagram illustrated in FIG. 2, contacts 13 or 14 are incorporated into the thermal cut-out device with the contacts 15,16 and 14 or 13 incorporated into a separate relay (not shown as such in FIG. 2) which is triggered by the operation of the contacts of the thermal cut-out device.

When the heater is first energised the thermal cut-out device is in its normal position and allows current to pass to the lamps 10a, 10b, 10c, and 10d which in the full power configuration illustrated are connected in parallel with each other. Contacts 13,14 and 15 are closed in this configuration. If the temperature of the probe of the thermal cut-out device exceeds a first predetermined value the cut-out device operates, not to disconnect all of the heating elements from the source of electric power, but to open the contacts 13,14 and 15 and to close contacts 16. This connects the lamps in a configuration in which two lamps are connected in series and are connected in parallel to the remaining two lamps which are also connected in series. This reduces the power to substantially 34 percent of full power and allows the temperature of the glass ceramic to fall and the temperature of the probe of the thermal cut-out device to fall to a second predetermined temperature at which the contacts 16 are opened and the contacts 13,14 and 15 are closed to restore full power to the heating elements.

It is important in this embodiment that the contacts 15 should open prior to the closing of the contacts 16 and that the contacts 16 should not close until any arc caused by the opening of the contacts 15 is extinguished. Similarly the contacts 16 should open and any arc should be extinguished before the contacts 15 close. The timing of the opening and closing of the contacts 13 and 14 is not critical.

It is not essential to maintain energisation of the heating elements (although at reduced power) if the temperature of the probe of the thermal cut-out device exceeds the first predetermined value, and the heating elements could be completely disconnected from the supply of electrical energy under this condition.

We have found that splitting the power supply to the lamps between the thermal cut-out device and the relay optimises the use of the thermal cut-out device and permits use of a less expensive relay than would otherwise be necessary.

Figure 3:
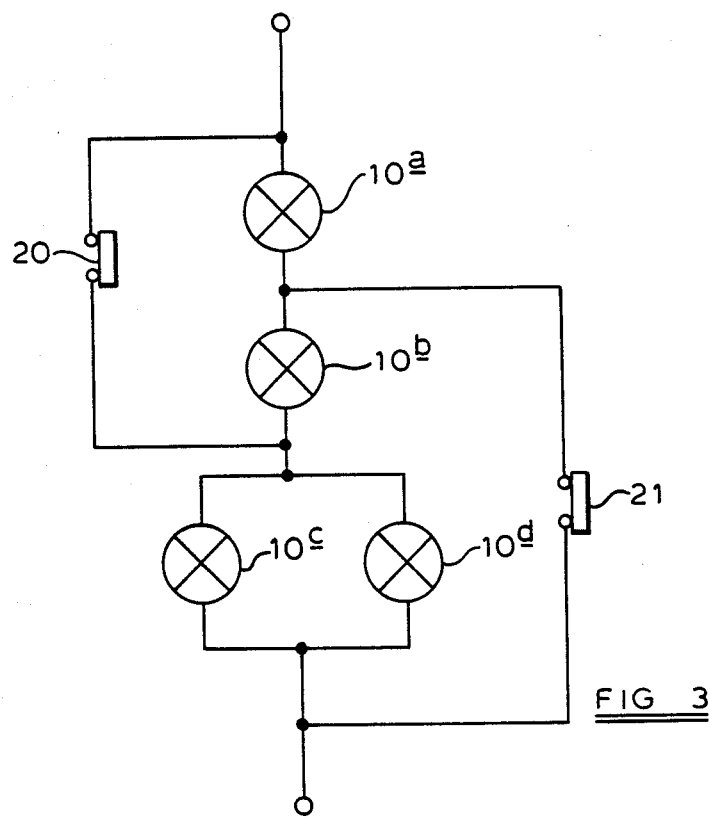
FIG. 3 is a circuit diagram illustrating another embodiment of an electric heater assembly according to the present invention.

In the embodiment of the electric heater assembly according to the present invention illustrated by the circuit diagram of FIG. 3 there are four heating elements 10a, 10b, 10c and 10d as with the embodiment of FIG. 2. The configuration shown in FIG. 3 corresponds to full power while the contacts 20,21 of the thermal cut-out device and an associated relay are closed.

If the temperature of the probe of the thermal cut-out device exceeds a first predetermined value the thermal cut-out device operates to open the contacts, 20,21 and thus to connect two of the lamps in parallel with each other and the remaining lamps in series with the parallel pair. This reduces the power to substantially 18 percent of full power and allows the temperature of the glass ceramic to fall and the temperature of the probe of the thermal cut-out device to fall to a second predetermined temperature at which the contacts 20 and 21 close to restore full power to the heating elements.

With this embodiment the timing of the opening and closing of the contacts is not crucial because no short circuit configuration can exist. Because the contacts 20 carry the current of three lamps whereas the contacts 21 carry the current of only two lamps we have found that with 1 kW lamps it is preferable to incorporate the contacts 21 into the thermal cut-out device and to incorporate the contacts 20 into a separate relay. With lower power lamps it would be feasible to interchange the arrangement of the contacts 20 and 21, so that the thermal cut-out device switches the larger current. Once again it is not essential to maintain energisation of the heating elements at reduced power if the temperature of the probe of the thermal cut-out device exceeds the first predetermined value, and the heating elements could be completely disconnected from the supply of electrical energy under this condition.

Figure 4:
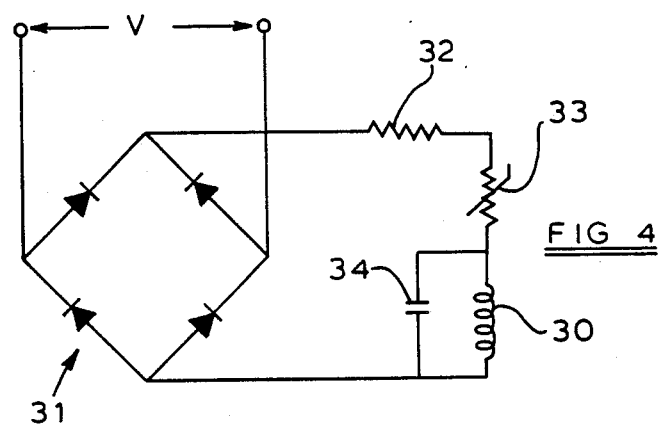
FIG. 4 is a circuit diagram illustrating means for ensuring operation of a relay.

The relay incorporating the contacts 20 can be connected in parallel to the contacts 21 of the thermal cut-out device. As an alternative the relay can be connected in parallel to the lamp 10a in FIG. 3. However, in the full power configuration, although the voltage across the relay assembly is 100 percent of supply voltage when the contacts 21 are closed, the voltage only falls to 40 percent of supply voltage when the contacts 21 are open. This is not normally sufficiently low to ensure that the contacts 20 open when the contacts 21 open. This can be overcome by adopting the configuration illustrated in the circuit diagram of FIG. 4 according to which the supply voltage V is applied to the relay coil 30 by way of a bridge rectifier 31 and a resistor 32 and a voltage dependent resistor 33 which are connected in series. A capacitor 34 is connected in parallel with the relay coil 30.

We claim:

1. An electric heater assembly for a glass ceramic top cooker comprising:
   a plurality of electric heating elements;
   a thermal cut-out device incorporating a first set of contacts for controlling the supply of electric current to at least one of the heating elements; and
   means associated with the thermal cut-out device and incorporating a second set of contacts for controlling the supply of electric current to at least another of the heating elements,
   wherein in the event of the thermal cut-out device detecting a first predetermined temperature the first set of contacts moves from a first position to a second position thereby causing the second set of contacts to move from a first position to a second position and in co-operation with the second set of contacts connects the heating elements in a lower power configuration or cuts off the supply of electric power to the heating elements and wherein when, as a result of the movement of the first and second sets of contacts from their first positions to their second positions, the thermal cut-out device subsequently detects a second predetermined temperature lower than the first predetermined temperature the first set of contacts moves from its second position to its first position thereby causing the second set of contacts to move from its second position to its first position and connecting the heating elements in their original configuration.

2. An electric heater assembly according to claim 1, wherein the electric heating elements are in the form of infra-red lamps.

3. An electric heater assembly according to claim 1, wherein four electric heating elements are provided.

4. An electric heater assembly according to claim 1, wherein the means associated with the thermal cut-out device comprises a relay.

5. An electric heater assembly according to claim 4, wherein the relay incorporates a coil which is connected in parallel with the first set of contacts.

6. An electric heater assembly according to claim 4, wherein the relay incorporates a coil which is connected in parallel with one of the heating elements.

7. An electric heater assembly according to claim 6 and including a voltage dependent resistor connected in series with the relay coil.

8. An electric heater assembly for a glass ceramic top cooker comprising:
a plurality of electric heating elements;
a thermal cut-out device incorporating a first set of contacts for controlling the supply of electric current to at least one of the heating elements; and
means associated with the thermal cut-out device and in corporating a second set of contacts for controlling the supply of electric current to at least another of the heating elements,
wherein in the event of the thermal cut-out device detecting a first predetermined temperature the first set of contacts moves from a first position to a second position thereby causing the second set of contacts to move from a first position to a second position and in co-operation with the second set of contacts connects the heating elements in a lower power configuration and wherein when, as a result of the movement of the first and second sets of contacts from their first positions to their second positions, the thermal cut-out device subsequently detects a second predetermined temperature lower than the first predetermined temperature the first set of contacts moves from its second position to its first position thereby causing the second set of contacts to move from its second position to its first position and connecting the heating elements in their original configuration.

9. An electric heater assembly for a glass ceramic top cooker comprising:
a plurality of electric heating elements;
a thermal cut-out device incorporating a first set of contacts for controlling the supply of electric current to at least one of the heating elements; and
means associated with the thermal cut-out device and incorporating a second set of contacts for controlling the supply of electric current to at least another of the heating elements,
wherein in the event of the thermal cut-out device detecting a first predetermined temperature the first set of contacts moves from a first position to a second position thereby causing a second set of contacts to move from a first position to a second position and in co-operation with the second set of contacts cuts off the supply of electric power to the heating elements and wherein when, as a result of the movement of the first and second sets of contacts from their first positions to their second positions, the thermal cut-out device subsequently detects a second predetermined temperature lower than the first predetermined temperature the first set of contacts moves from its second position to its first position thereby causing the second set of contacts to move from its second position to its first position and connecting the heating elements in their original configuration.

* * * * *